United States Patent [19]
Takahashi et al.
[11] Patent Number: 4,791,571
[45] Date of Patent: Dec. 13, 1988

[54] ROUTE BUS SERVICE CONTROLLING SYSTEM

[75] Inventors: Shinichi Takahashi, Tokyo; Hisao Ishii, deceased, late of Kanagawa, by Mariko Ishii, legal representative; Kiyoshi Shinkawa; Takeshi Kawahara, both of Hyogo; Toshiyuki Manita, Tokyo, all of Japan

[73] Assignees: Tokyu Corporation; Mitsubishi Denki Kabushiki Kaisha, both of Tokyo, Japan

[21] Appl. No.: 917,077

[22] Filed: Oct. 8, 1986

[30] Foreign Application Priority Data

| | | | |
|---|---|---|---|
| Oct. 29, 1985 | [JP] | Japan | 60-245228 |
| Oct. 29, 1985 | [JP] | Japan | 60-245229 |
| Oct. 29, 1985 | [JP] | Japan | 60-245230 |
| Nov. 5, 1985 | [JP] | Japan | 60-247373 |

[51] Int. Cl.[4] .......................... G06F 15/48; G08G 1/01
[52] U.S. Cl. .......................... 364/436; 340/910; 340/994
[58] Field of Search .......................... 364/436, 424; 340/916, 340/917, 994, 910; 342/457

[56] References Cited

U.S. PATENT DOCUMENTS

| | | | |
|---|---|---|---|
| 3,568,161 | 3/1971 | Knickel | 340/993 |
| 3,662,267 | 5/1972 | Reed | 340/993 |
| 3,886,515 | 5/1975 | Cottin et al. | 340/994 |
| 3,919,686 | 11/1975 | Narbaits-Jaureguy et al. | 340/993 |
| 4,092,718 | 5/1978 | Wendt | 364/436 |
| 4,122,523 | 10/1978 | Morse et al. | 364/436 |
| 4,212,069 | 7/1980 | Baumann | 364/467 |
| 4,220,946 | 9/1980 | Henriot | 340/994 |

FOREIGN PATENT DOCUMENTS

| | | | |
|---|---|---|---|
| 0219859 | 4/1987 | European Pat. Off. | 340/994 |
| 54-11878 | 5/1979 | Japan . | |

*Primary Examiner*—Parshotam S. Lall
*Assistant Examiner*—Thomas G. Black
*Attorney, Agent, or Firm*—Bernard, Rothwell & Brown

[57] ABSTRACT

A route bus service controlling system comprising ground radio unit installed at a terminal or start-and-end point of bus service routes, a turn point of each route and a plurality of passage points therebetween and serving to detect the passage time of each route bus at every point, the ground radio units being further capable of sending the detected time signal to a central service controller and, after receiving service information from the central service controller, transmitting such information to each route bus; the central service controller for first receiving the actual run information of each route bus from the ground radio units, then making up, on the basis of the received service information, modified service schedules for the buses in the individual route sections so as to realize an optimal time interval service of all the buses running on the respective routes, and transmitting via the ground radio units to the corresponding buses the modified service schedules with various conditions added thereto inclusive of the halt time periods at the bus stops, traffic congestion on the roads and so forth; and service schedule display units for first receiving from the ground radio units the modified service schedules made up by the central service controller, and then displaying the modified service schedules for the individual buses so as to achieve a satisfactory route bus service of optimal time intervals at the passing points.

8 Claims, 20 Drawing Sheets

(NOTES) 1 : ↔ ARRIVAL RANGES OF SCHEDULES ①—③

2 : ○ BASIC SCHEDULE; ○' ACTUAL RUN:

h : DEPARTURE INTERVAL

FIG.9

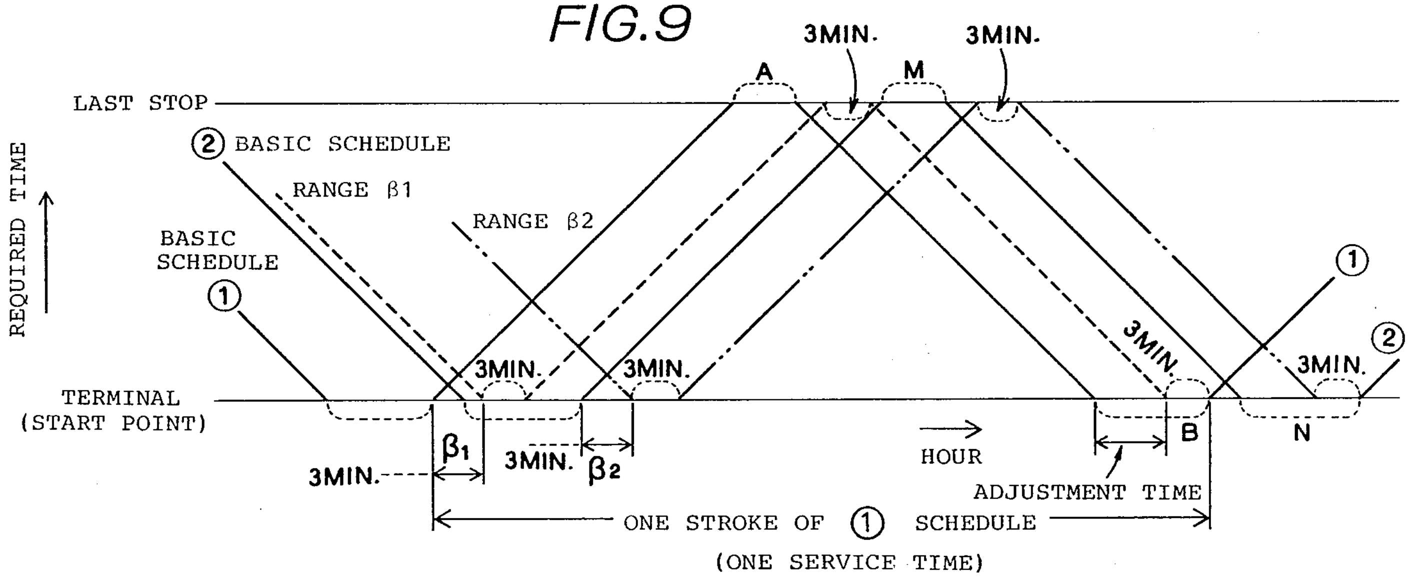

(NOTES)
1. β : ALLOWABLE EXTENSION RANGE
2. WAIT TIME : EACH DOTTED LINE AT THE START AND TURN POINTS DENOTES A STANDARD WAIT TIME (A, B, M, N) IN THE SCHEDULES.
3. ADJUSTMENT TIME : WAIT TIME RANGE DETERMINED BY EXCLUDING THREE MINUTES FROM A DEPARTURE TIME IN THE BASIC SCHEDULE.
4. d : ALLOWABLE REST TIME FOR A BUS DRIVER DEPENDENT ON A DEPARTURE TIME AT THE START AND TURN POINTS. IN THE ABOVE EXAMPLE, d = 3 (MIN).

FIG. 11A

| CLASSIFIED MEASURES FOR MODIFICATION OF SCHEDULES (REGULAR INTERVAL ADJUSTMENT WITH EXTENSION IN EACH ROUTE) | | | | |
|---|---|---|---|---|
| CASE | ARRIVAL CONDITIONS | | | DEPARTURE CONDITIONS |
| | ESTIMATED ARRIVAL OF FIRST BUS ① | ESTIMATED ARRIVAL OF SECOND BUS ② | ESTIMATED ARRIVAL OF THIRD BUS ③ | MEASURES |
| 1 | WITHIN ADJUSTMENT TIME | WITHIN ADJUSTMENT TIME | WITHIN 3 MIN+β3 | * START FIRST BUS AT SCHEDULED HOUR.<br>* START SECOND BUS WITH DELAY α2.<br>* START THIRD BUS AFTER 3 MINUTES FROM ARRIVAL → α3<br>α2 = α3/2 |
| | COMBINATION OF CASES A AND B | | | |
| 2 | WITHIN ADJUSTMENT TIME | WITHIN 3 MIN+β2 | WITHIN ADJUSTMENT TIME | * START FIRST BUS WITH DELAY α1.<br>* START SECOND BUS AFTER 3 MINUTES FROM ARRIVAL → α2<br>* START THIRD BUS WITH DELAY α3.<br>α2 = α1/2, α1 = α2/2 |
| | COMBINATION OF CASES B AND C | | | |
| 3 | WITHIN 3 MIN+β1 | WITHIN ADJUSTMENT TIME | WITHIN ADJUSTMENT TIME | * START FIRST BUS AFTER 3 MINUTES FROM ARRIVAL → α1<br>* START SECOND BUS WITH DELAY α2.<br>* START THIRD BUS AT SCHEDULED HOUR.<br>α2 = α1/2 |
| | COMBINATION OF CASES C AND A | | | |

FIG. 11A ↕ FIG. 11B
FIG. 11A ↕ FIG. 11B

FIG. 11B

FIG. 11A ↑ / ↓ FIG. 11B

| | | | | |
|---|---|---|---|---|
| 4 | WITHIN ADJUSTMENT TIME | WITHIN 3 MIN+β1 | WITHIN 3 MIN+β2 | * START THIRD BUS AFTER 3 MINUTES FROM ARRIVAL → α3<br>i) WHEN ESTIMATED DEPARTURE DELAY OF SECOND BUS IS GREATER THAN α3/2:<br>* START SECOND BUS AFTER 3 MINUTES FROM ARRIVAL → α2<br>* START FIRST BUS WITH DELAY α1 (=α3/2).<br>ii) WHEN ESTIMATED DEPARTURE DELAY OF SECOND BUS IS SMALLER THAN α3/2:<br>* START SECOND BUS WITH DELAY α2 (=α3/2).<br>* START FIRST BUS AT SCHEDULED HOUR. |
| | COMBINATION OF CASES B AND C | | | |
| 5 | WITHIN 3 MIN+β1 | WITHIN 3,MIN+β2 | WITHIN ADJUSTMENT TIME | * IN RELATION TO ESTIMATED DEPARTURE DELAYS α1' AND α2' OF FIRST AND SECOND BUSES:<br>i) WHEN α1'≧ 2α2'<br>* START FIRST BUS AFTER 3 MINUTES FROM ARRIVAL → α1 (=α1')<br>* START SECOND BUS WITH DELAY α2 (=α1/2).<br>* START THIRD BUS AT SCHEDULED HOUR.<br>ii) WHEN α1'<2α2':<br>* START SECOND BUS AFTER 3 MINUTES FROM ARRIVAL → α1 (=α3')<br>* START FIRST BUS WITH DELAY α1 (=α2/2).<br>* START THIRD BUS WITH DELAY α3 (=α2/2). |
| | COMBINATION OF CASES C AND B | | | |

FIG. 11B ↑ / ↓ FIG. 11C

FIG. 11C

FIG. 11B
FIG. 11C

<table>
<tr><td rowspan="2">6</td><td>WITHIN 3 MIN+$\beta 1$</td><td>WITHIN ADJUSTMENT TIME</td><td>WITHIN 3 MIN+$\beta 3$</td><td rowspan="2">* IN RELATION TO ESTIMATED DEPARTURE DELAYS $\alpha 1'$ AND $\alpha 3'$ OF FIRST AND THIRD BUSES:<br>* START THIRD BUS AFTER 3 MINUTES FROM ARRIVAL $\rightarrow \alpha 3$ $(=\alpha 3')$<br>* START FIRST BUS AFTER MINUTES FROM ARRIVAL $\rightarrow \alpha 1$ $(=\alpha 1')$<br>* START SECOND BUS WITH DELAY $\alpha 2$ $(=\alpha 1 + \alpha 3/2)$.</td></tr>
<tr><td colspan="3">COMBINATION OF CASES C AND B</td></tr>
<tr><td rowspan="2">7</td><td>WITHIN 3 MIN+$\beta 1$</td><td>WITHIN 3 MIN+$\beta 2$</td><td>WITHIN 3 MIN+$\beta 3$</td><td rowspan="2">* IN RELATION TO ESTIMATED DEPARTURE DELAYS $\alpha 1'$, $\alpha 2'$ AND $\alpha 3'$ OF FIRST, SECOND AND THIRD BUSES:<br>i) WHEN $\alpha 1' < \alpha 2'$, $\alpha 3'$:<br>* DELAY ENTIRE SCHEDULES BY $\alpha 1'$, AND APPLY CASE 4.<br>ii) WHEN $\alpha 2' < \alpha 1'$, $\alpha 3'$:<br>* DELAY ENTIRE SCHEDULES BY $\alpha 2'$, AND APPLY CASE 6.<br>iii) WHEN $\alpha 3' < \alpha 1'$, $\alpha 2'$:<br>* DELAY ENTIRE SCHEDULES BY $\alpha 3'$, AND APPLY CASE 5.</td></tr>
<tr><td colspan="3">COMBINATION OF CASES C AND C</td></tr>
</table>

(NOTES) CASES A, B AND C IN THE ABOVE LIST CORRESPOND RESPECTIVELY TO CASES A, B AND C IN FIG. 10

FIG. 11B
FIG. 11C

FIG. 12

β : EXTENSION RANGE (IN MINUTES)
t : EXTENSION SET VALUE (IN MINUTES)

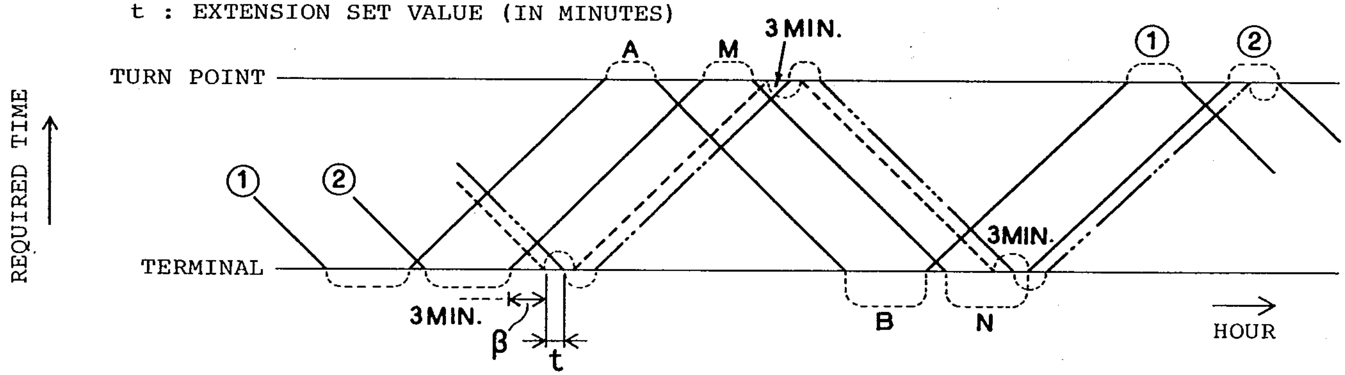

* DEFINITION OF t : A VALUE SET BEYOND THE RANGE β WHEN RESUMPTION OF THE BASIC SCHEDULE IS ESTIMATED TO BE POSSIBLE AFTER THE NEXT OR SUCCEEDING STROKE.

(NOTES)
1. β : ALLOWABLE EXTENSION RANGE
2. WAIT TIME : EACH DOTTED LINE AT THE START AND TURN POINTS DENOTES A STANDARD WAIT TIME (A, B, M, N) IN THE SCHEDULES.
3. ADJUSTMENT TIME : WAIT TIME RANGE DETERMINED BY EXCLUDING THREE MINUTES FROM A DEPARTURE TIME IN THE BASIC SCHEDULE.
4. d : ALLOWABLE REST TIME FOR A BUS DRIVER DEPENDENT ON A DEPARTURE TIME AT THE START AND TURN POINTS. IN THE ABOVE EXAMPLE, d = 3 (MIN).

FIG. 14A

CLASSIFIED MEASURES FOR MODIFICATION OF SCHEDULES (REGULAR INTERVAL ADJUSTMENT WITH EXTENSION IN EACH ROUTE)

| CASE | ARRIVAL CONDITIONS: ESTIMATED ARRIVAL OF FIRST BUS ① | ARRIVAL CONDITIONS: ESTIMATED ARRIVAL OF SECOND BUS ② | ARRIVAL CONDITIONS: ESTIMATED ARRIVAL OF THIRD BUS ③ | DEPARTURE CONDITIONS: MEASURES |
|---|---|---|---|---|
| 1 | WITHIN ADJUSTMENT TIME | WITHIN ADJUSTMENT TIME | WITHIN 3 MIN+β3+t | * START FIRST BUS AT SCHEDULED HOUR.<br>* START SECOND BUS WITH DELAY α2.<br>* START THIRD BUS AFTER 3 MINUTES FROM ARRIVAL → α3<br>α2 = α3/2 |
| | COMBINATION OF CASES A AND B | | | |
| 2 | WITHIN ADJUSTMENT TIME | WITHIN 3 MIN+β2+t | WITHIN ADJUSTMENT TIME | * START FIRST BUS WITH DELAY α1.<br>* START SECOND BUS AFTER 3 MINUTES FROM ARRIVAL → α2<br>* START THIRD BUS WITH DELAY α3.<br>α2 = α1/2, α1 = α2/2 |
| | COMBINATION OF CASES B AND C | | | |
| 3 | WITHIN 3 MIN+β1+t | WITHIN ADJUSTMENT TIME | WITHIN ADJUSTMENT TIME | * START FIRST BUS AFTER 3 MINUTES FROM ARRIVAL → α1<br>* START SECOND BUS WITH DELAY α2.<br>* START THIRD BUS AT SCHEDULED HOUR.<br>α2 = α1/2 |
| | COMBINATION OF CASES C AND A | | | |

FIG. 14A FIG. 14B

FIG. 14A FIG. 14B

FIG.14B

FIG. 14A

| | | | | |
|---|---|---|---|---|
| 4 | WITHIN ADJUSTMENT TIME | WITHIN 3 MIN+β1+t | WITHIN 3 MIN+β2+t | * START THIRD BUS AFTER 3 MINUTES FROM ARRIVAL → α3<br>i) WHEN ESTIMATED DEPARTURE DELAY OF SECOND BUS IS GREATER THAN α3/2:<br>* START SECOND BUS AFTER 3 MINUTES FROM ARRIVAL → α2<br>* START FIRST BUS WITH DELAY α1 (=α3/2).<br>ii) WHEN ESTIMATED DEPARTURE DELAY OF SECOND BUS IS SMALLER THAN α3/2:<br>* START SECOND BUS WITH DELAY α2 (=α3/2).<br>* START FIRST BUS AT SCHEDULED HOUR. |
| | COMBINATION OF CASES B AND C | | | |
| 5 | WITHIN 3 MIN+β1+t | WITHIN 3 MIN+β2+t | WITHIN ADJUSTMENT TIME | * IN RELATION TO ESTIMATED DEPARTURE DELAYS α1' AND α2' OF FIRST AND SECOND BUSES:<br>i) WHEN α1'≧ 2α2'<br>* START FIRST BUS AFTER 3 MINUTES FROM ARRIVAL → α1 (=α1')<br>* START SECOND BUS WITH DELAY α2 (=α1/2).<br>* START THIRD BUS AT SCHEDULED HOUR.<br>ii) WHEN α1'<2α2':<br>* START SECOND BUS AFTER 3 MINUTES FROM ARRIVAL → α1 (=α3')<br>* START FIRST BUS WITH DELAY α1 (=α2/2).<br>* START THIRD BUS WITH DELAY α3 (=α2/2). |
| | COMBINATION OF CASES C AND B | | | |

FIG. 14C

FIG. 14C

FIG. 14B ↑ FIG. 14C ↓

<table>
<tr><td rowspan="2">6</td><td>WITHIN 3 MIN+β1+t</td><td>WITHIN ADJUSTMENT TIME</td><td>WITHIN 3 MIN+β3+t</td><td rowspan="2">* IN RELATION TO ESTIMATED DEPARTURE DELAYS α1' AND α3' OF FIRST AND THIRD BUSES:<br>* START THIRD BUS AFTER 3 MINUTES FROM ARRIVAL → α3 (=α3')<br>* START FIRST BUS AFTER MINUTES FROM ARRIVAL → α1 (=α1')<br>* START SECOND BUS WITH DELAY α2 (=α1 + α3/2).</td></tr>
<tr><td colspan="3">COMBINATION OF CASES C AND B</td></tr>
<tr><td rowspan="2">7</td><td>WITHIN 3 MIN+β1+t</td><td>WITHIN 3 MIN+β2+t</td><td>WITHIN 3 MIN+β3+t</td><td rowspan="2">* IN RELATION TO ESTIMATED DEPARTURE DELAYS α1', α2' AND α3' OF FIRST, SECOND AND THIRD BUSES:<br>i) WHEN α1'<α2', α3':<br>* DELAY ENTIRE SCHEDULES BY α1', AND APPLY CASE 4.<br>ii) WHEN α2'<α1', α3':<br>* DELAY ENTIRE SCHEDULES BY α2', AND APPLY CASE 6.<br>iii) WHEN α3'<α1', α2':<br>* DELAY ENTIRE SCHEDULES BY α3', AND APPLY CASE 5.</td></tr>
<tr><td colspan="3">COMBINATION OF CASES C AND C</td></tr>
</table>

FIG. 14B ↑ FIG. 14C ↓

(NOTES) CASES A, B AND C IN THE ABOVE LIST CORRESPOND RESPECTIVELY TO CASES A, B AND C IN FIG. 13

ROUTE BUS SERVICE CONTROLLING SYSTEM

BACKGROUND OF THE INVENTION

1. Field of the Invention

The present invention relates to a system for controlling a route bus service by first collecting information at passage points of buses running on a regular route according to a basic schedule, then estimating the time of arrival of each running bus at a terminal, subsequently modifying the basic schedule so as to enable the route buses to depart from the terminal sequentially at equal time intervals, and displaying service information such as a timetable and so forth on a service indicator installed in each bus.

2. Description of the Prior Art

In the current urban traffic where automobiles occupy a major position, there exist some serious urban problems including traffic congestion and so forth that result from overpopulated city structure, and it is of great importance to secure, in the highly dense urban road network, smooth service of transportation means such as route buses which are operated principally for the public.

Similarly in medium- and long-distance transportation means which serve for communication between cities, there may occur troubles that normal service conforming to basic schedules fails to be achieved due to road construction or traffic accidents on regular routes.

In view of such circumstances mentioned above, one prior invention titled "Method for control of specific automobile service" is known as disclosed in Japanese Patent Publication No. 54-11878 (published on May 18, 1979).

FIGS. 1 through 3 illustrate a conventional apparatus designed for controlling the service of specific vehicles such as route buses. In FIG. 1, a central service controller 1 and ground receivers 2 . . . are connected to each other by means of circuit lines 3 . . . . The ground receivers 2*a*, 2*b*, 2*c* are equipped with antennas 4*a*, 4*b*, 4*c* respectively and are installed at fixed intervals along a road 9 which is a route where buses 5 . . . run according to a basic schedule. In this example the route buses 5*a*, 5*b*, 5*c* are running sequentially in the order of service, and mobile radio units 7*a*, 7*b*, 7*c* equipped with antennas 6*a*, 6*b*, 6*c* are installed in the buses 5*a*, 5*b*, 5*c* respectively together with service indicators 8*a*, 8*b*, 8*c*.

In the system having the above-mentioned constitution for controlling the operation of vehicles such as route buses, each of the service indicators 8 has such a display panel 10 as shown in FIG. 2. On the obverse side of the display panel 10, individual indication contents are exhibited with, for example, a departure indicator lamp 11 showing characters for "departure" and a standby indicator lamp 12 showing characters for "standby". Each of such indicator lamps 11, 12 internally has a blink means such as a light emitting diode. The display panel 10 is attached at an easy-to-see position for a driver in the route bus. Meanwhile, the driver ought to carry with him a service timetable 13 of FIG. 3 when leaving an office or the like to begin the daily route work. There are prepared several kinds of such timetables 13 which are different from one another depending on a schedule number column 14 and a day-of-week column 15 even for the same route. In the contents described on the timetable 13, a terminal name and stop names are shown in the uppermost row 16 . . . , and the times of passage at such bus stops are written respectively in the lower rows 17. The illustrated service timetable 13 represents an exemplary schedule No. 11 for Saturday. This timetable 13 prescribes that the bus departing from the office at 12:11 reaches a first stop "Tarumi" at 12:19, then leaves there at 12:21 after a two-minute rest to pass via a stop "Sannomiya" and reaches a turn point "Okamoto" at 12:51, subsequently leaves there at 12:56 after a five-minute rest and, via "Sannomiya" at 13:08, reaches "Tarumi" at 13:24. Ten minutes later, the bus departs from "Tarumi" again at 13:34 and thereafter the service is kept according to the timetable.

The drivers on their duties with the above timetables 13 run the route buses 5*a*, 5*b*, 5*c* respectively according to the prescribed schedules with adjustment of the departure and arrival times of the buses in conformity to the instructions received from the service controlling system shown in FIG. 1.

Now the operation of the above service controlling system will be described below with reference to FIG. 1. First the radio waves transmitted from the running buses 5*a*–5*c* are caught by the antenna 4*a*–4*c* of the ground receivers 2*a*–2*c* installed at predetermined points on the road 9 of a service route. The waves from the buses 5*a*–5*c* are transmitted by the mobile radio units 7*a*–7*c* through the antennas 6*a*–6*c* at fixed frequencies selected with respect to the individual buses. Therefore the intervals between the route buses 5 running in the order of 5*a*, 5*b*, 5*c* are caught in the form of radio waves by the ground receivers 2*a*–2*c*, whose outputs are transmitted via the circuit lines 3 . . . to the central service controller 1. Then the controller 1 estimates the time required for the specific route bus to pass through the sections where the ground receivers 2*a*–2*c* are installed. Such estimation is executed by various computations based on the past data in such a manner that, for example, the time to be required for the bus 5*c* to pass through the section 9*a* between the ground receivers 2*a* and 2*b* is computed by averaging the actually required passage times of the preceding buses 5*a*, 5*b* through the section 9*a*. In another example, the time to be required for the route bus 5*b* to pass through the section 9*b* is estimated on the basis of the time actually required for the preceding route bus 5*a* to pass through the section 9*b*. In accordance with such estimations, service instructions are outputted from the central service controller 1 to the individual route buses 5*a*–5*c*. The instructions are exhibited by turning on the corresponding indicator lamps 11, 12 . . . in the display panels 10 of the service indicators 8*a*–8*c*. For example, when the route buses 5*b*, 5*c* pass through the ground receivers 2*b*, 2*a*, the instructions from the central service controller 1 are transmitted to the service indicators 8*b*, 8*c* via the ground receivers 2*b*, 2*a* through the antennas 6*b*, 6*c* and the mobile radio units 7*b*, 7*c* in the route buses 5*b*, 5*c*.

Although not shown in FIG. 1, service information indicators for giving certain service instructions to the bus drivers are installed at selected positions along the road 9 in the route sections 9*a*, 9*b*, so that the information corresponding to the service instructions to the individual route buses running in such sections are visually presented by the indicators.

Therefore, although each of the route bus drivers carries with him the timetable of FIG. 3, he receives the service instructions so modified as to maintain proper running of each route bus 5 at a fixed interval depending on the degree of traffic congestion in the sections 9*a*, 9*b* and so forth of the road 9, whereby the route bus service is controlled properly according to such instructions.

In the conventional route bus service controlling system constituted as mentioned above, if the service information indicators for drivers are installed on the ground, the information required for adjustment of running intervals and so forth are presented by indication lamps. Accordingly, in case confirmation of the information is needed during the running, it becomes necessary to install considerably large indicators for easy notice by the drivers, hence raising a problem that such indicators are not distinguishable with facility from other signboards or the like and are therefore prone to be overlooked.

Furthermore, with respect to the service indicator installed in each bus, merely some items for instruction are indicated (such as instruction "departure" in FIG. 2). It is essentially necessary that all the required information relative to time and so forth be indicated for any bus driver who performs his duty according to the basic schedule. However, due to the absence of a service instruction by such time information, there exist some difficulties in maintaining the scheduled regular time.

The conventional timetable of a service schedule illustrated in FIG. 3 is made of paper and is handed to a driver at his departure from the office. Since it gives merely fixed time information, if the schedule is disordered by traffic conditions, the driver is not permitted to change the schedule by himself and therefore needs to resume the prescribed service time on the basic schedule by shortening the passenger deal time and adjusting the bus speed while keeping the run on the route, or the predetermined schedule is never restored. As the individual drivers do not adjust the time among themselves (each driver makes no time adjustment by himself and tries to secure the proper service conforming to his fixed timetable), once the schedule is rendered out of order, there occurs successive departure of the buses from the terminal and therefore it becomes necessary to modify the schedule in accordance with the traffic conditions. Thus the proper service conforming to the basic schedule is not attainable, resulting in inconvenience for passengers. This is one of the reasons for reduction of the bus utilization rate.

SUMMARY OF THE INVENTION

It is a first object of the present invention to provide an improved route bus service controlling system which enables route bus drivers to depart from a terminal at fixed time intervals without the necessity of modifying the schedule in accordance with the service instruction while performing the running and other duties, thereby enhancing the convenience of passengers with assurance of the fixed-interval running proximate to the basic schedule.

A second object of the invention resides in furnishing each route bus driver with accurate service information inclusive of time information to realize maintenance of the scheduled regular time, instead of inaccurate service information stating merely "departure" or "standby" and the service time given on a printed timetable.

And a third object of the invention is to furnish each route bus driver with accurate service information at an easy-to-see position in the bus, not by means of ground indicators or the like installed along a route road, thereby securing the exact route bus service and alleviating the duty burden on the drivers.

In order to achieve the objects mentioned above, the route bus service controlling system of this invention comprises ground radio units for first detecting the passage time of route buses at each of a departure-and-arrival terminal of a plurality of routes, turn points of such routes and a plurality of passage points between the route terminal and the turn points, then sending the detected passage time to a central service controller, and transmitting to each route bus the service information received from the central service controller; the central service controller for preparing, relative to the buses running in individual sections of the route, service schedules which respectively enable the corresponding buses to run at optimal time intervals on the route in accordance with the actual running information of the route buses received from the ground radio units, and then transmitting the modified service schedules to the corresponding buses through the ground radio units; and service schedule display units for receiving from the ground radio units the modified service schedules prepared by the central service controller and then displaying the modified service schedules for the individual route buses so as to operate the buses at the optimal time intervals with respect to the individual passage points.

The modified service schedule is rendered more accurate by the central service controller which computes various conditions such as the halt time at each bus stop, the state of traffic congestion on the road and so forth. It is a matter of course that the service schedule display units are installed at the positions most easily perceivable by the drivers. However, such display units may be installed at the easiest-to-see position for the passengers in the bus, for example behind the driver's seat, or may be incorporated in the display device or the like provided at the bus stop.

BRIEF DESCRIPTION OF THE DRAWINGS

FIG. 6 (*b*) is a partially enlarged diagram of FIG. 6 (*a*);

FIGS. 9, 10A, 10B, 11A, 11B and 11C relate to another embodiment of the present invention, in which FIGS. 9 and 10 show schedules, and FIG. 11 is a list of measures to be taken in individual cases with respect to tabulated conditions of arrival at and departure from a bus terminal;

FIGS. 12, 13A, 13B, 14A, 14B and 14C relate to a further embodiment of the invention, in which FIGS. 12 and 13 show schedules, and FIG. 14 is a list of measures to be taken in individual cases with respect to tabulated conditions of arrival at and departure from a bus terminal in the embodiment of FIGS. 12 through 14.

DETAILED DESCRIPTION OF THE PREFERRED EMBODIMENTS

Hereinafter some preferred embodiments of the present invention will be described in detail.

Figure 4:
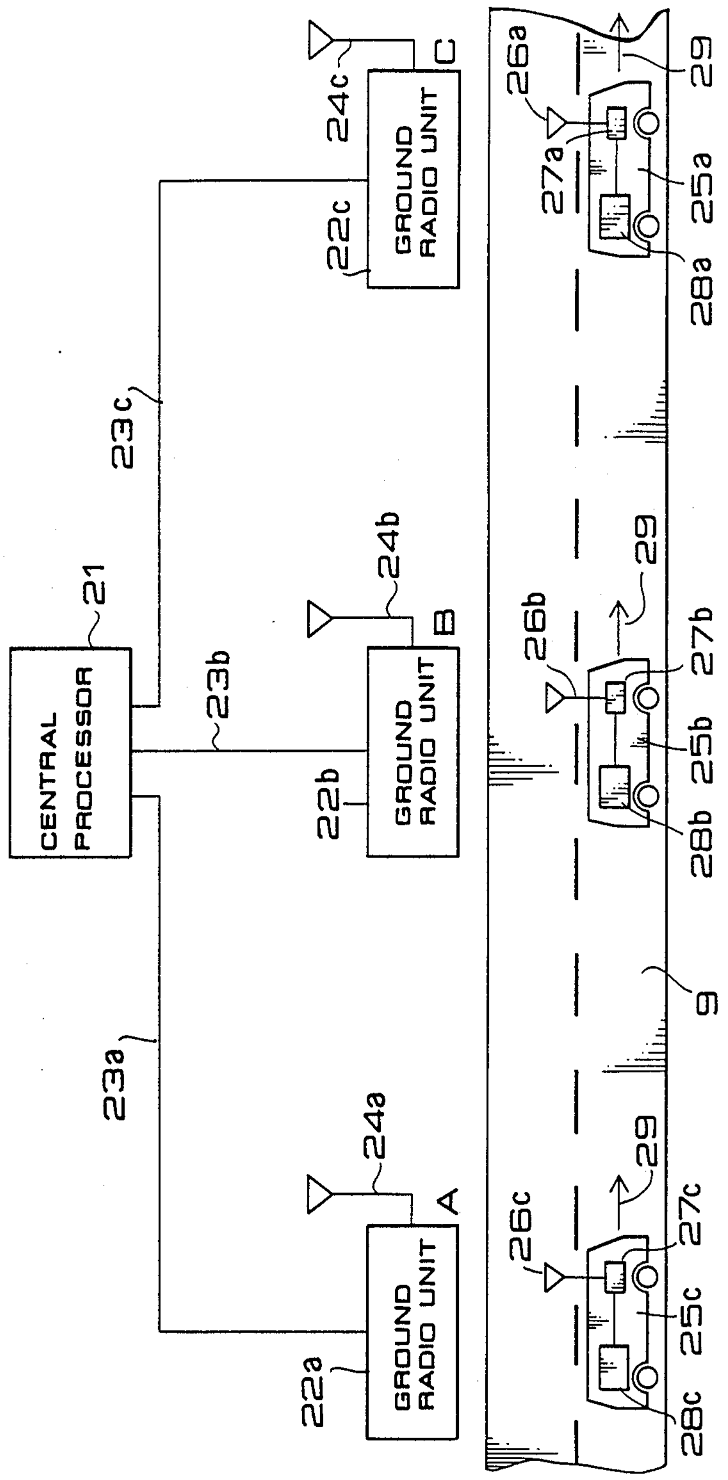
FIG. 4 is a block diagram of the entirety of a route bus service controlling system embodying the present invention.

In a first exemplary embodiment of FIG. 4, there are shown a central processor 21; ground radio units 22a–22c installed at points A–C along a road; route buses 25a–25c; mobile radio units 27a–27c installed in the buses to communicate with the ground radio units 22a–22c; service information display units 28a–28c; antennas 24a–24c of the ground radio units 22a–22c; circuit lines 23a–23c connecting the central processor 21 with the ground radio units 22a–22c respectively; antennas 26a–26c of the mobile radio units 27a–27c; a running direction 29 of the route buses 25a–25c; and a running route 9 of the buses 25a–25c.

Figure 5:
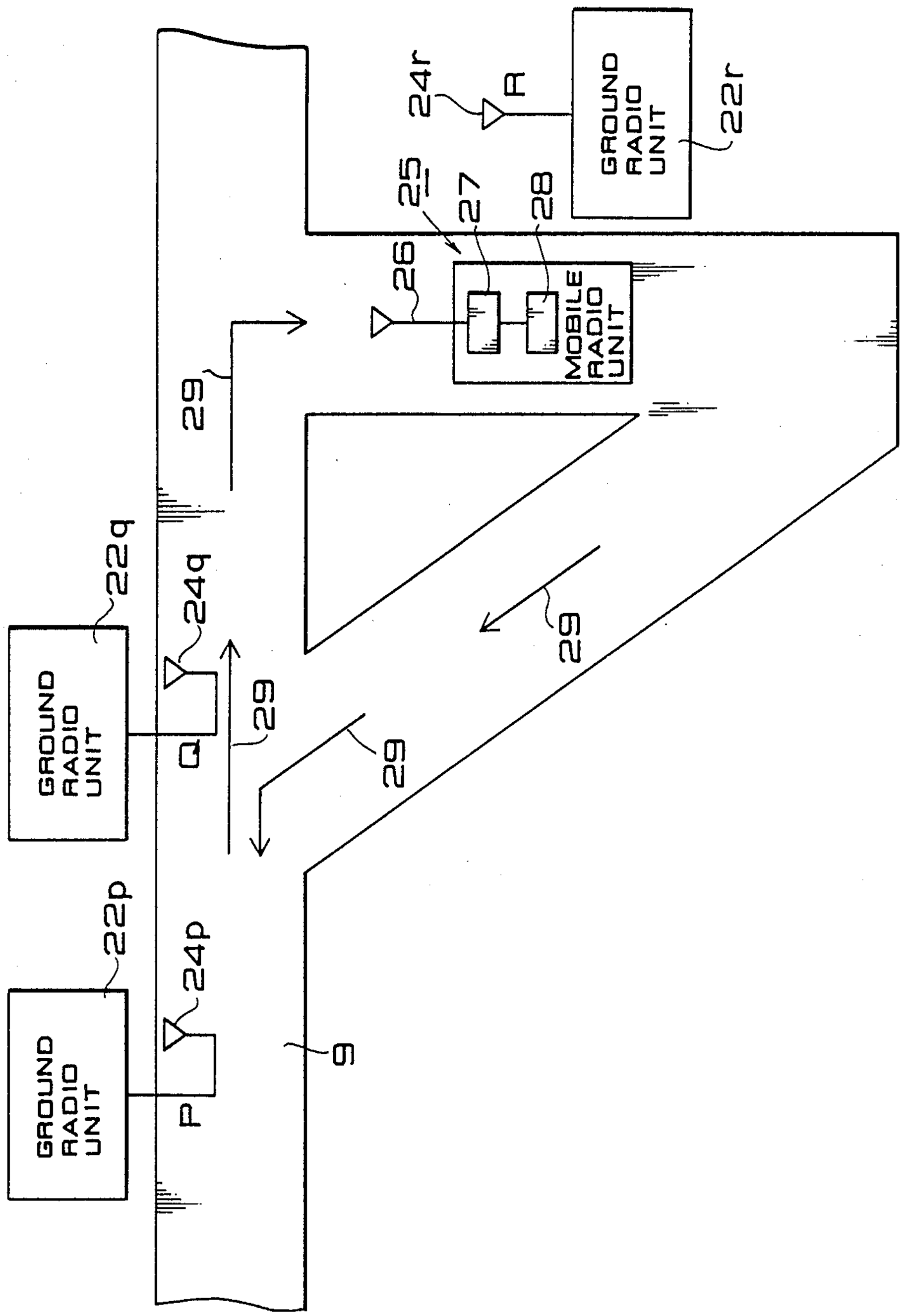
FIG. 5 is a block diagram illustrating the disposition of ground radio units and a mobile radio unit in the vicinity of a terminal in the embodiment of FIG. 4.

In FIG. 5, there are shown ground radio units 22p–22r; a mobile radio unit 27 installed in a route bus; a service information display unit 28; a mobile antenna 26 mounted on a route bus; a running direction 29; and a running route 9.

Figure 6A:
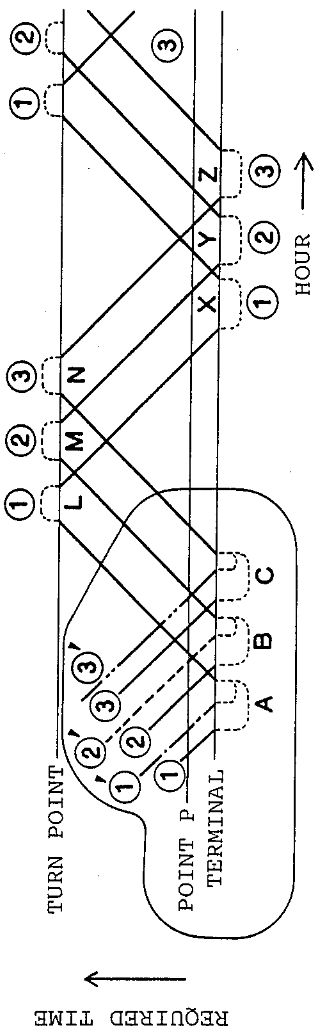
FIG. 6 (*a*) shows how a modified service timetable is made up in the system of FIG. 4.
Figure 6B:
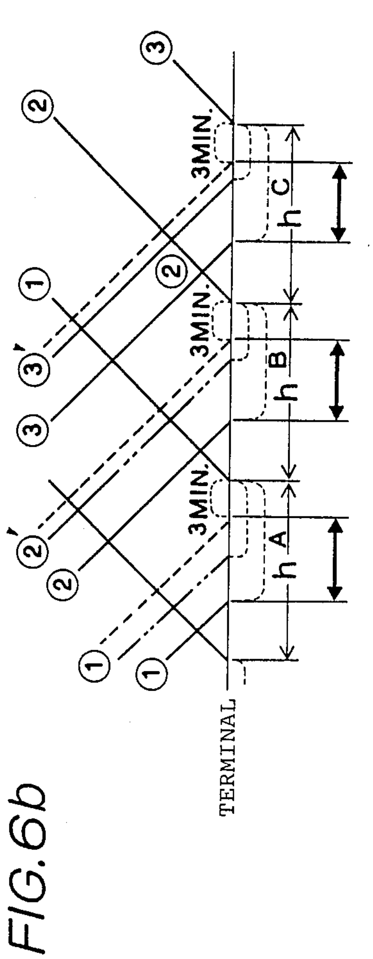

FIGS. 6(*a*) and 6(*b*) graphically shows basic schedules and estimated schedules of arrival at a bus terminal.

Figure 1:
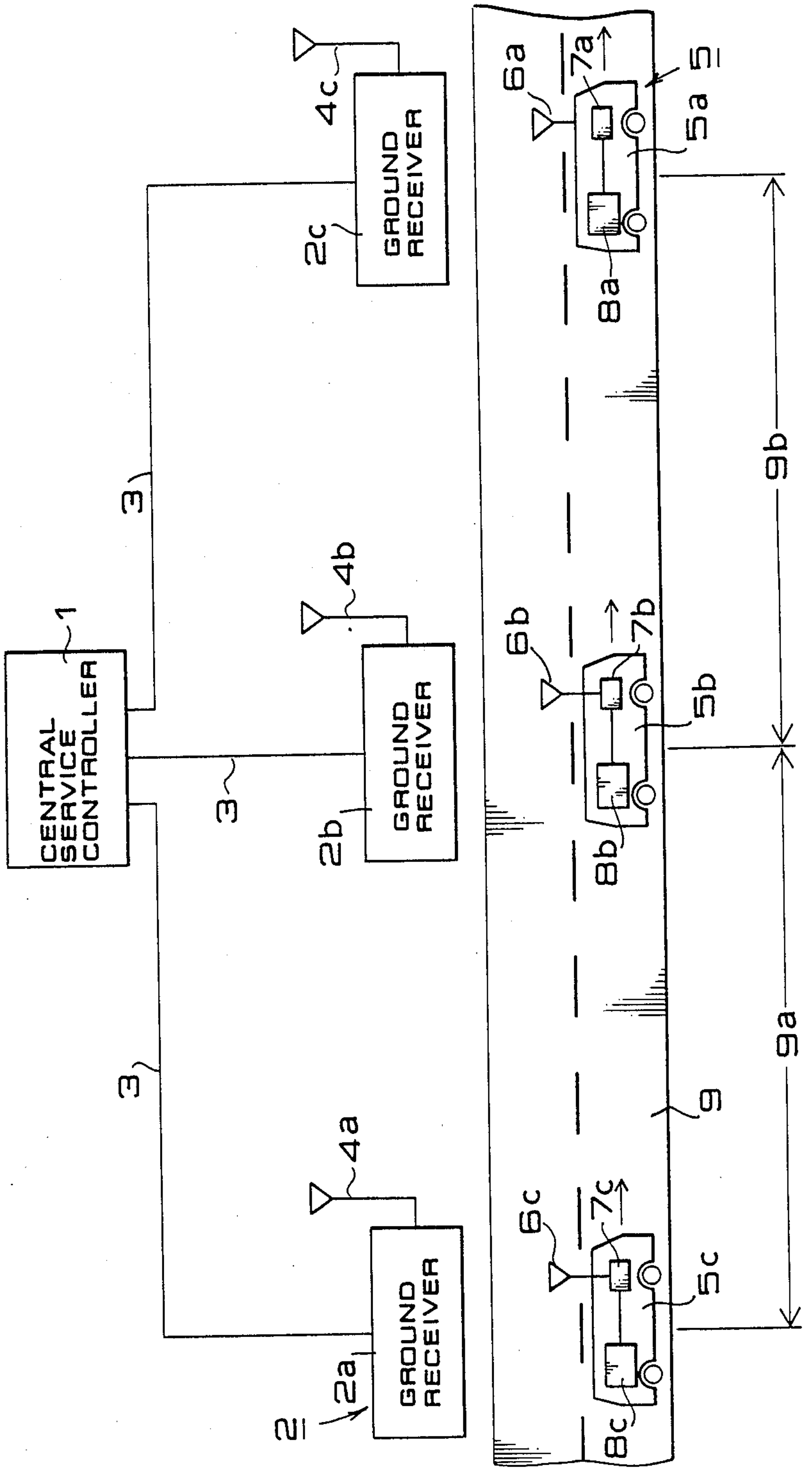
FIG. 1 (PRIOR ART)
FIG. 1 is a block diagram of an exemplary conventional system for controlling a specific bus service.
Figure 7:
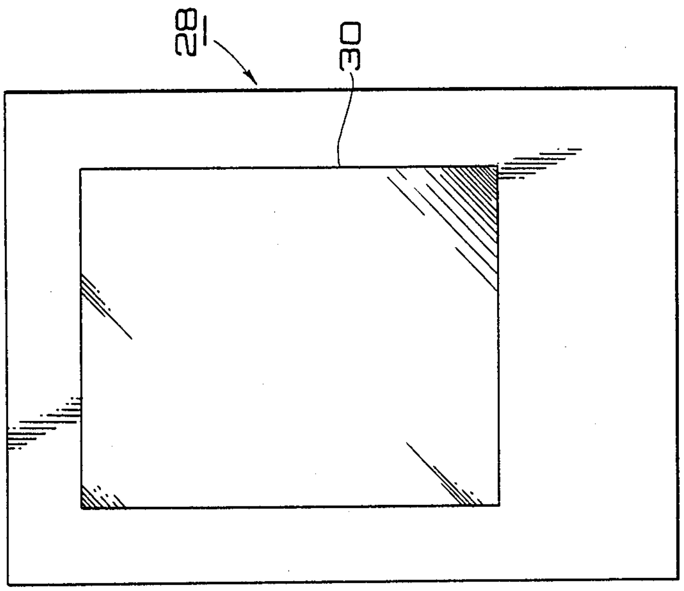
FIG. 7 is a block diagram of a service information display unit in the embodiment of FIGS. 4 through 6 (*b*)
Figure 2:
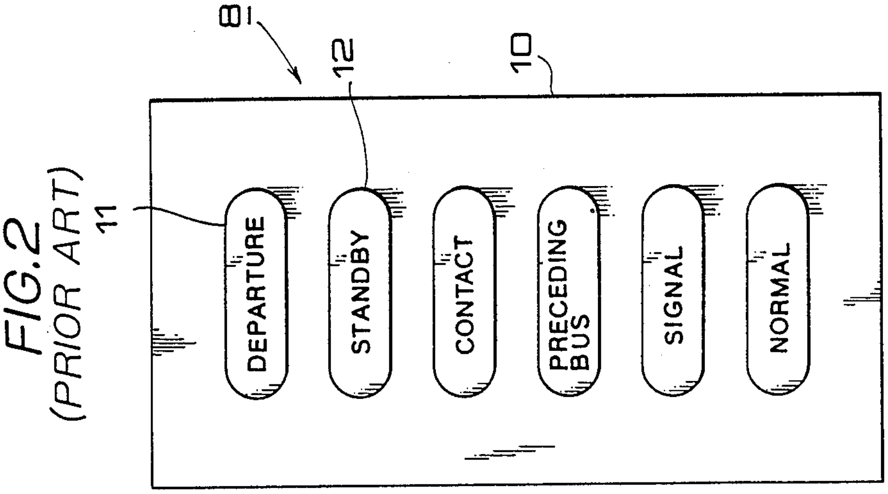
FIG. 2 (PRIOR ART)
FIG. 2 is a front view of a display panel of a service indicator employed in the system of FIG. 1.
Figure 3:
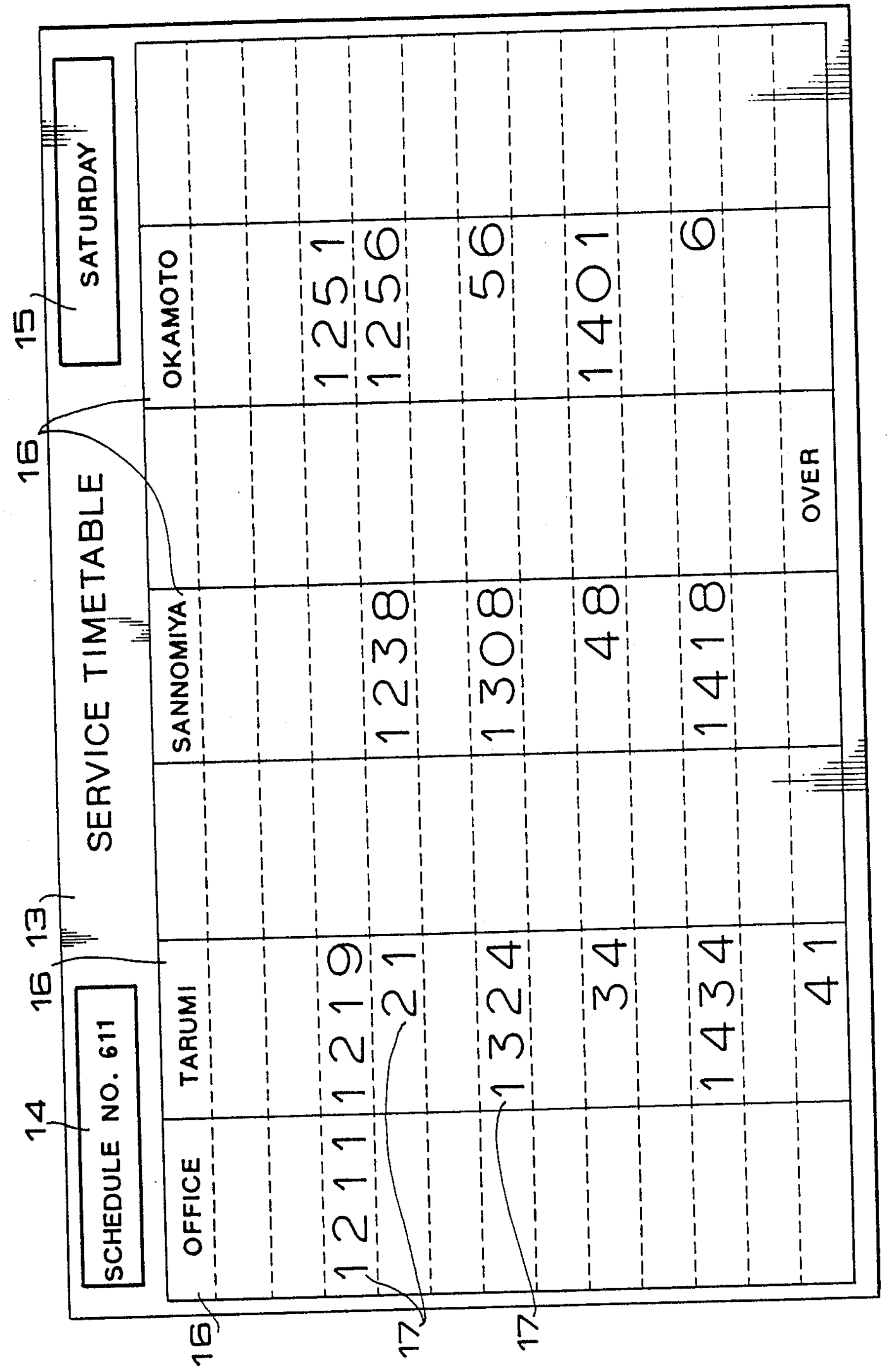
FIG.3 (PRIOR ART)
FIG. 3 is a front view of a service timetable used in the system of FIG. 1.

In FIG. 7 are shown a service information display unit 28 and a display panel 30 thereof.

Figure 8:
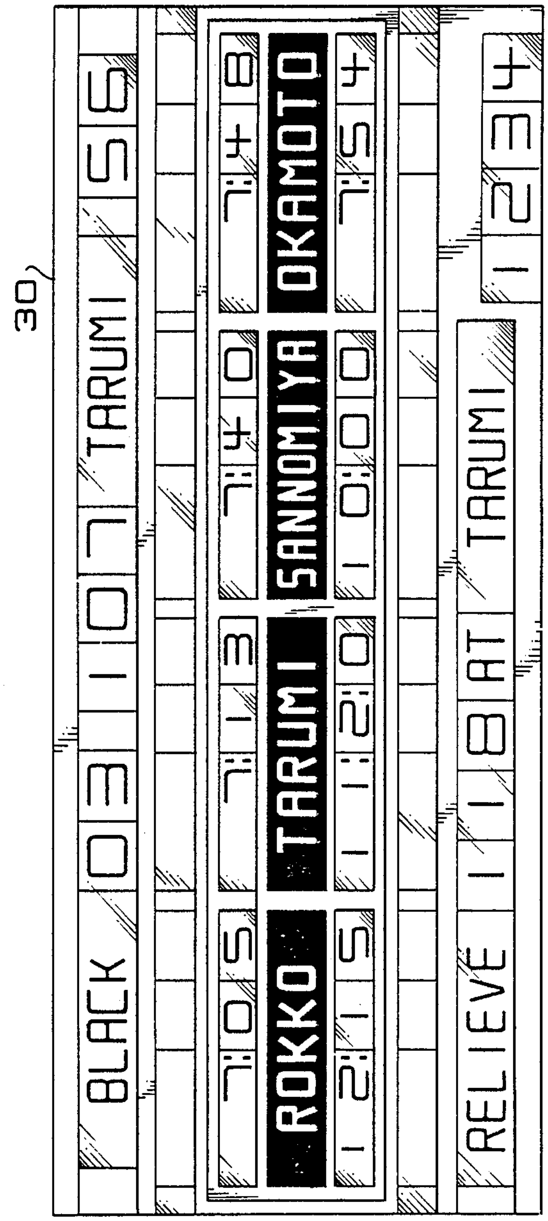
FIG. 8 is a front view of an exemplary service timetable exhibited on a display panel of the service information display unit shown in FIG. 7.

FIG. 8 illustrates exemplary instructions indicative of service information.

In the above constitution, the system operation is performed in the following manner. Estimation of the time of each bus is carried out similarly to the conventional example as shown in FIG. 4, where ground radio units 22a–22c are disposed at points A, B, C along the route 9, and the information relative to passage of the route buses 25a–25c is transmitted via the circuit lines 23a–23c to the central processor 21, thereby executing controlled follow-up of the individual buses at the road points. Accordingly it becomes possible to estimate the moments of passage of buses 25a–25c through the ground radio units 22a–22c disposed along the route 9. When the central processor 21 estimates the time required for the buses to pass through individual elementary sections of the route related to the ground radio units 22a–22c and so forth (not shown) installed along the route, the latest passage data has the highest reliability since the traffic volume changes momentarily, and therefore an average is calculated by weighting the actually required time lengths of some buses having passed the route sections in the past. And then the average value based on such past data is added to the actual moment of passage through the immediately posterior ground radio unit.

FIG. 5 illustrates the disposition of ground radio units 22p–22r at a bus terminal and in the vicinity thereof. The ground radio unit 22p at point P serves to estimate the arrival time of each bus at the terminal. Since the passage information of the individual buses on the route of FIG. 4 is collected in the central processor 21, it is possible for the central processor 21 to estimate the arrival time of the first, second and third buses at point P on the basis of such passage information. Furthermore, when the first arrival bus has passed point Q posterior to point P, the central processor 21 determines a schedule of this bus alone by using the aforesaid estimated value.

The schedule thus determined is transmitted via the circuit line 23 to the ground radio unit 22r installed at the terminal of point R. And when the arrival bus has reached the ground radio unit 22r at the terminal, the determined schedule representative of service information is exhibited temporarily on the display unit 28 by the communication between the mobile radio unit and the ground radio unit.

FIG. 6 (*a*) graphically shows the arrival hour and the required time to the terminal in the estimated service state of the first bus (corresponding to ①') at point P, the second bus (corresponding to ②') and the third bus (corresponding to ③'), in which solid lines ①, ②, ③ represent basic schedules.

FIG. 6(*b*) is an enlarged view of a principal portion of FIG. 6(*a*), in which A, B, C, L, M, N, P, X, Y, Z denote wait time lengths at the respective departure and arrival points in the basic schedules ①, ②, ③ and are of fixed values predetermined in each schedule. A value of 3 minutes means a time allocated for a driver to go to a lavatory or take a rest at the terminal and the turn point, and such time length cannot be shortened.

For realizing proper departure at regular intervals (h) from the terminal in the schedules ①, ② and ③, it is necessary that, as illustrated, the buses arrive at the terminal according to the ①'-③' within the ranges shown by arrows.

FIG. 7 is a block diagram of the service information display unit 28 which exhibits the service information on its display panel 30.

FIG. 8 illustrates an example of such service information where, out of the entire service timetable, one stroke from the terminal is displayed.

For example, it instructs the driver to depart from Rokko stop at 7:05 hour, then to arrive at Okamoto stop of a turn point at 7:48 hour, subsequently to depart therefrom at 7:54 hour after a rest and to return to Rokko terminal at 12:15 hour.

Although the above embodiment is so constituted as to visually present the service information on the display unit 28 installed in each bus, it may be altered in such a manner that the passage hours (in the actual run) at the individual bus stops on the way to the terminal are presented on an unshown display device installed at a suitable position of the terminal, and estimated arrival hours at the terminal in the individual schedules may also be displayed in assorted colors.

In the above embodiment, the service display panel 30 may be composed of any device that is adapted for display of time by the use of, for example, EL element, CRT, plasma or liquid crystal.

Now another embodiment of the present invention will be described below with reference to FIGS. 9 through 11.

FIG. 9 graphically shows basic schedules and varied schedules representing the estimated arrivals of buses at a terminal.

Figure 10A:
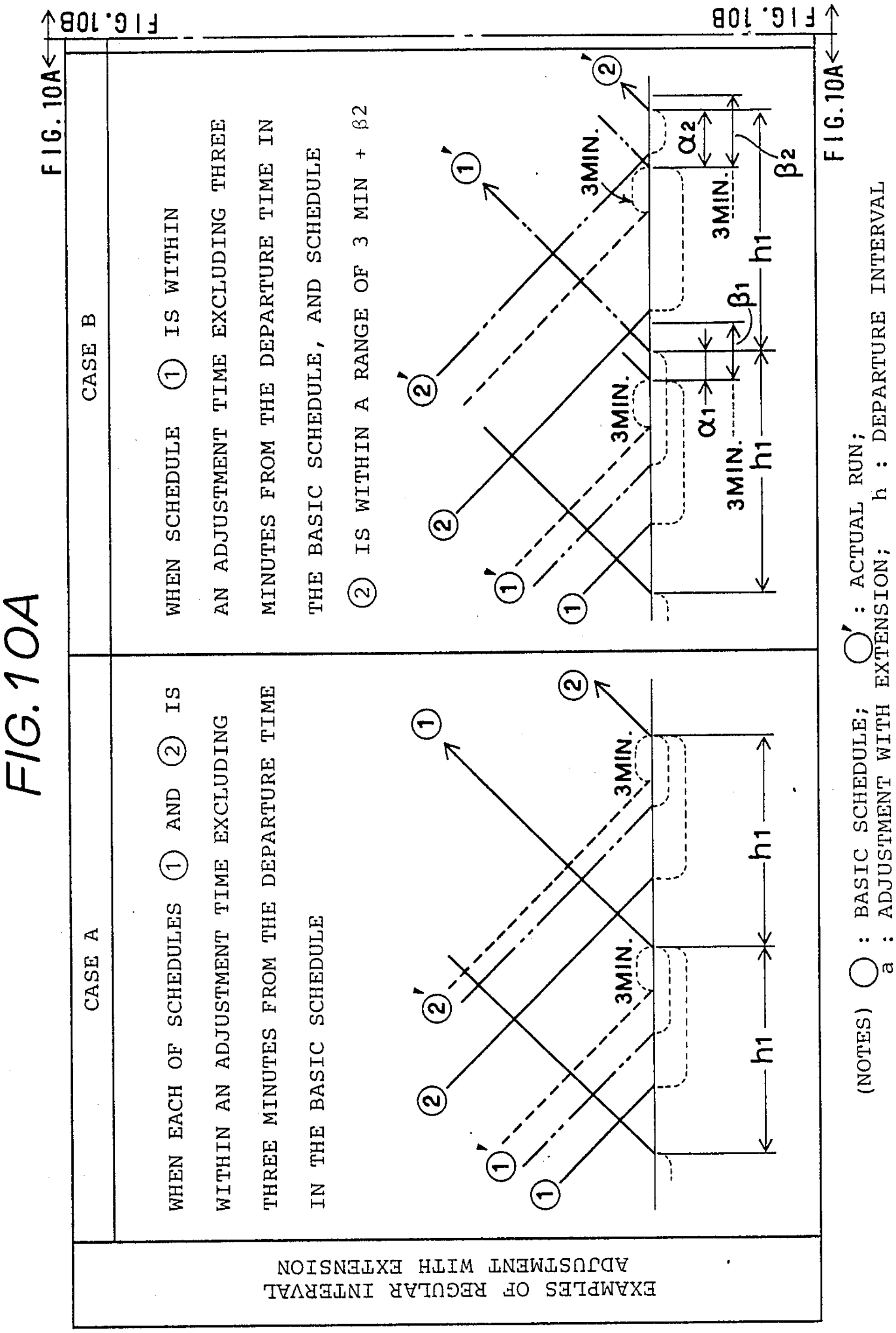
Figure 10B:
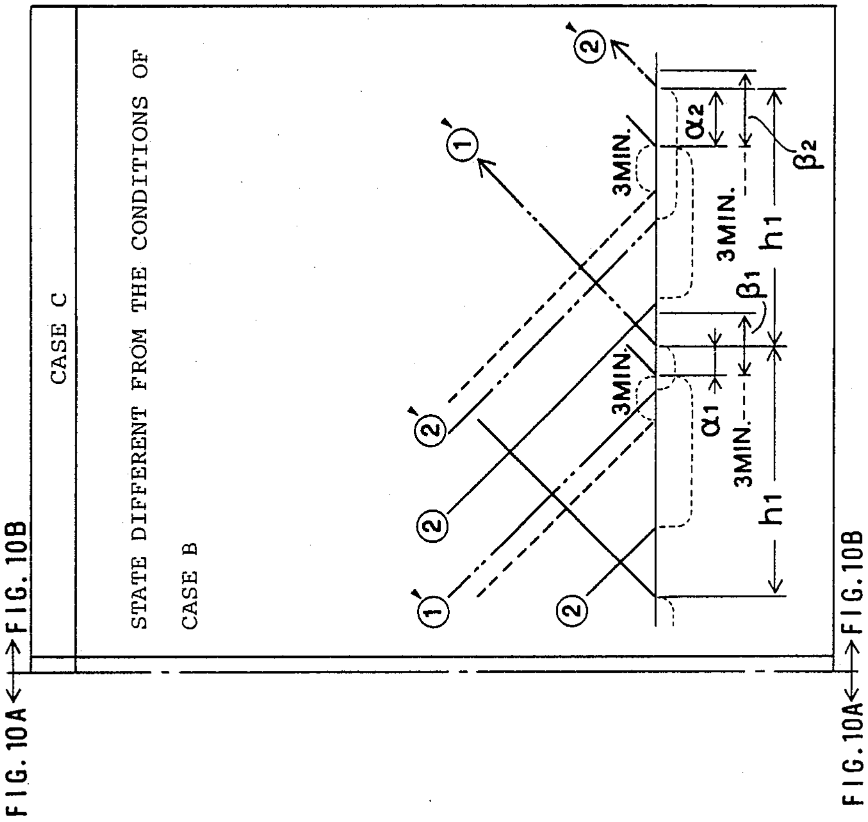

FIG. 10 shows some cases classified by the conditions of arrival at the bus terminal in schedules ① and ②.

And FIG. 11 shows a list of measures to be taken in individual cases of modifying the schedules.

With the exception of the above, the fundamental constitution of this embodiment is substantially the same as that of the foregoing embodiment described previously in connection with FIGS. 4, 5, 7 and 8, so that a repeated explanation is omitted here for the operation relative to the aforesaid drawings, and merely a particular operation of this embodiment alone will be described below.

FIG. 9 graphically shows schedules of route buses, wherein the hour is plotted along the abscissa and the required time between a departure point and an arrival point is plotted along the ordinate.

Basic schedules ① and ② conforming to a predetermined service plan are usually represented by schedule numbers. Each of A, B, M, N denotes a wait time at the departure or arrival point in the schedules ① and ②. Such wait time is prepared for absorbing a rest time d of a driver and any delay that may result from traffic condition on the route. In the current bus service where a driver continuously works for several strokes (one stroke=one service time=one reciprocation), if there occurs any delay due to traffic condition, an allowance in the total wait time is effective to resume the basic schedule after some strokes. For example, in the schedule ① of FIG. 9, the wait time of one stroke is A+B. An indication of "3 minutes" at the departure and arrival points in the figure denotes a permissible rest time d for a driver. "Adjustment time" in the figure is of a value particular to each schedule and means a wait time range excluding three minutes from the departure time in the basic schedule.

Each of $\beta 1$ and $\beta 2$ in the figure is defined as a delay or extension range with respect to, in the basic schedule, the departure time determined with reference to the arrival hour at the terminal in the schedule, and such range is obtained by subtracting d (min)×3=3 (min)×3=9 (min) from the wait time at the departure or arrival point.

FIG. 10 shows three cases (A, B, C) relative to estimated arrival states at the terminal in schedules ① and ②.

In the first case A, the schedules ① and ② respectively vary to ①' and ②' estimating the arrival at the terminal within the aforesaid adjustment time, so that the service is maintained as prescribed in the basic schedules without any modification thereof.

In the second case B, schedule ① varies to ①' estimating the arrival within the adjustment time, while the schedule ② varies to ②' which estimates the arrival with a delay in a range of 3 min+$\beta 2$. Therefore the schedule ② is extended by $\alpha 2$ while the schedule ① is adjusted by $\alpha 1$ to execute departure at a regular interval h1, where $\alpha 1$ and $\alpha 2$ denote delay time lengths in the schedules ① for ② for equalizing the departure intervals.

And in the third case C, the schedules ① varies to ①' which estimates the arrival with a delay in a range of 3 min+$\beta 1$, while the schedule ② varies to ②' estimating the arrival within the adjustment time. Therefore the schedule ① extended by $\beta 1$ while the schedule ② is adjusted by $\alpha 2$ to execute departure at a regular interval h1.

Since the above three cases A, B and C represent the arrival conditions in the two schedules ① and ② at the terminal, it is necessary at point P to follow up the schedules of three buses including the first-arrival one. In combining the three cases A, B and C with one another relative to the schedule of three buses, there are seven cases as listed in FIG. 11. (If the three buses returning in sequence arrive at the terminal within the adjustment time properly, their departures may be executed as prescribed in the respective basic schedules. So, here is described merely the cases where modification of the schedules is necessary.

Summarizing the individual cases listed in FIG. 11, modification of the schedules is carried out in such a manner that one bus estimated to depart with the longest delay from the regular departure hour prescribed in the basic schedule is selected out of the first, second and third buses on the way to arrive at the terminal, then the schedules anterior and posterior to such selected bus are modified with extension of the interval, and the extension length is gradually decreased for resuming the basic schedule to achieve regular-interval departures.

Now a further embodiment of the present invention will be described below with reference to FIGS. 12 through 14.

FIG. 12 graphically shows basic schedules and varied schedules representing the estimated arrivals of buses at the terminal.

Figure 13A:
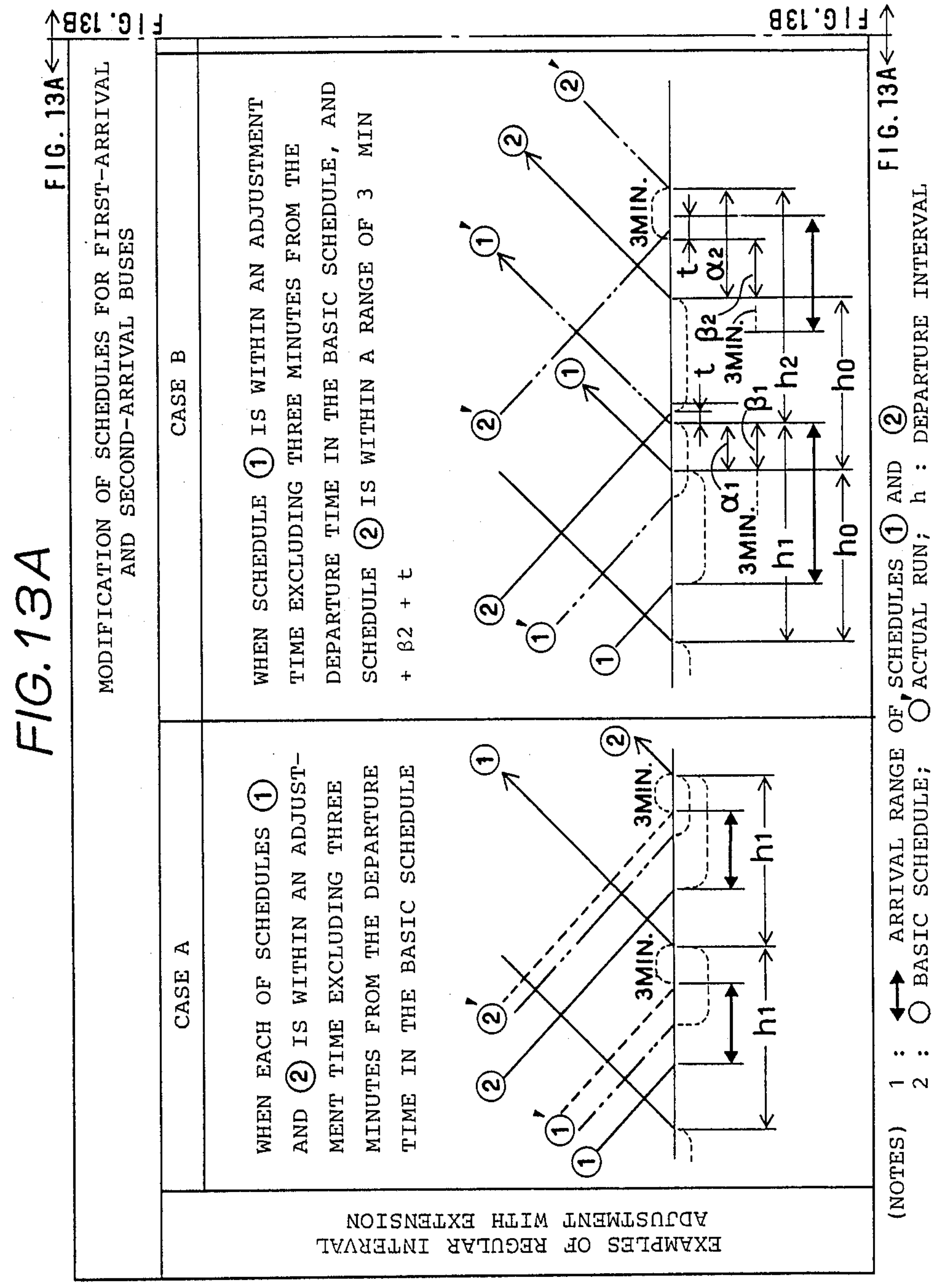
Figure 13B:
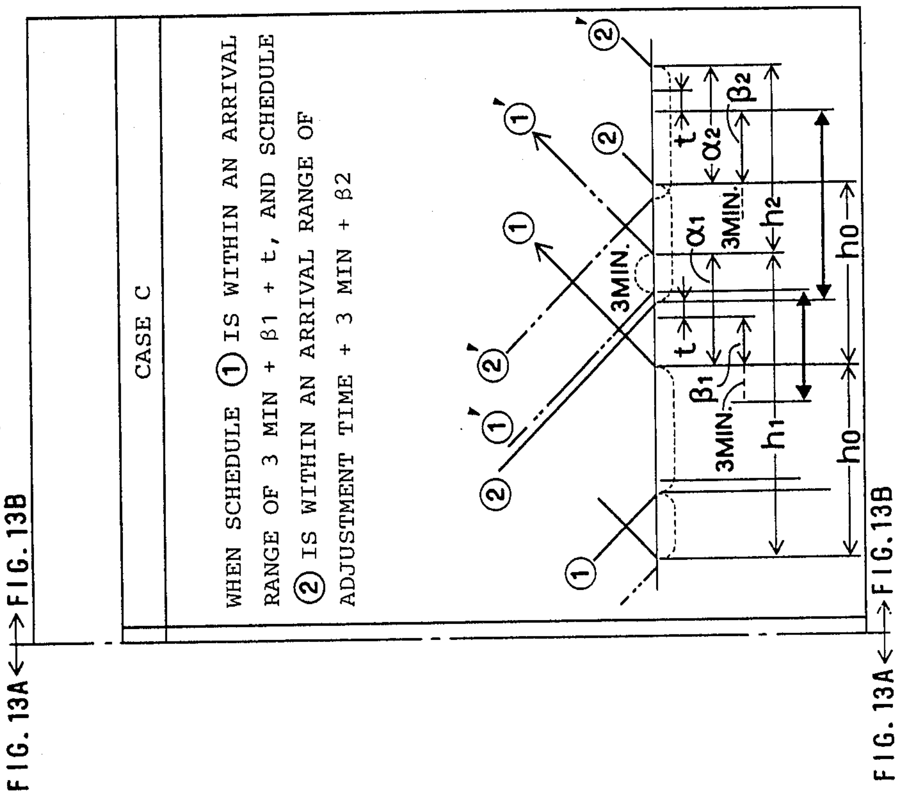

FIG. 13 shows some cases classified by the conditions of arrival at the terminal in schedules ① and ②.

And FIG. 14 shows a list of measures to be taken in individual cases of modifying the schedules.

In this embodiment, the operation is performed in the following manner.

FIG. 12 graphically shows schedules of route buses, wherein the hour is plotted along the abscissa and the required time between a departure point and an arrival point is plotted along the ordinate.

Basic schedules ① and ② conforming to a predetermined service plan are usually represented by schedule numbers. Each of A, B, M, N denotes a wait time at the departure or arrival point in the schedules ① and ②. Such wait time is prepared for absorbing a rest time d of a driver and any delay that may result from traffic condition on the route. In the current bus service where a driver continuously works for several strokes (one stroke=one service time=one reciprocation), if there occurs any delay due to traffic condition, an allowance in the total wait time is effective to resume the basic schedule after some strokes. For example, in the schedule ① FIG. 12, the wait time of one stroke is A+B. An indication of "3 minutes" at the departure and arrival points in the figure denotes a permissible rest time d for a driver. "Adjustment time" in the figure is of a value particular to each schedule and means a wait time range excluding three minutes from the departure time in the basic schedule.

In the figure, $\beta$ is defined as a delay or extension range with respect to, in the basic schedule, the departure time determined with reference to the arrival hour at the terminal in the schedule, and such range is obtained by subtracting d (min)×3=3 (min) ×3=9 (min) from the wait time at the departure or arrival point ($\beta$=A+B−9).

Further in the figure, t is defined as an extension set value established beyond the range $\beta$ when resumption of the basic schedule is estimated after the next or following stroke.

FIG. 13 shows three cases (A, B, C) relative to estimated arrival states at the terminal in schedules ① and ②.

In the first case A, the schedules ① and ② respectively vary to ①' and ②' estimating the arrival at the terminal within the aforesaid adjustment time, so that the service is maintained as prescribed in the basic schedules without any modification thereof.

In the second case B, the schedule ① varies to ①' estimating the arrival within a range of 3 min+$\beta$1, while the schedule ② varies to ②' which estimates the arrival to delay to the extension set value t beyond a range of 3 min+$\beta$2. Therefore the schedule 2 is extended by d2 while the schedule ① is adjusted by d1 to execute departures at h1 and h2 which are approximate to the regular intervals.

And in the third case C, the schedule ① varies to ①' estimating the arrival to delay to the extension set value t beyond a range of 3 min+$\beta$1, while the schedule ② varies to ②' estimating the arrival within a range of 3+$\beta$2. Therefore the schedule ① extended by d1 while the schedule 2 is adjusted by d2 to execute departures at h1 and h2 which are approximate to the regular intervals.

Since the above three cases A, B and C represent the arrival conditions in the two schedules ① and ② at the terminal, it is necessary at point P to follow up the schedules of three buses including the first-arrival one.

In combining the three cases A, B and C with one another relative to the schedule of three buses, there are seven cases as listed in FIG. 14. (If the three buses returning in sequence arrive at the terminal within the adjustment time properly, their departures may be executed as prescribed in the respective basic schedules. So, here is described merely the cases where modification of the schedules is necessary.

Summarizing the individual cases listed in FIG. 14, modification of the schedules is carried out in such a manner that one bus estimated to depart with the longest delay from the regular departure hour prescribed in the basic schedule is selected out of the first, second and third buses on the way to arrive at the terminal, then the schedules anterior and posterior to such selected bus are modified with extension of the interval, and the extension length is gradually decreased for resuming the basic schedules to achieve regular-interval departures.

Figure 15:
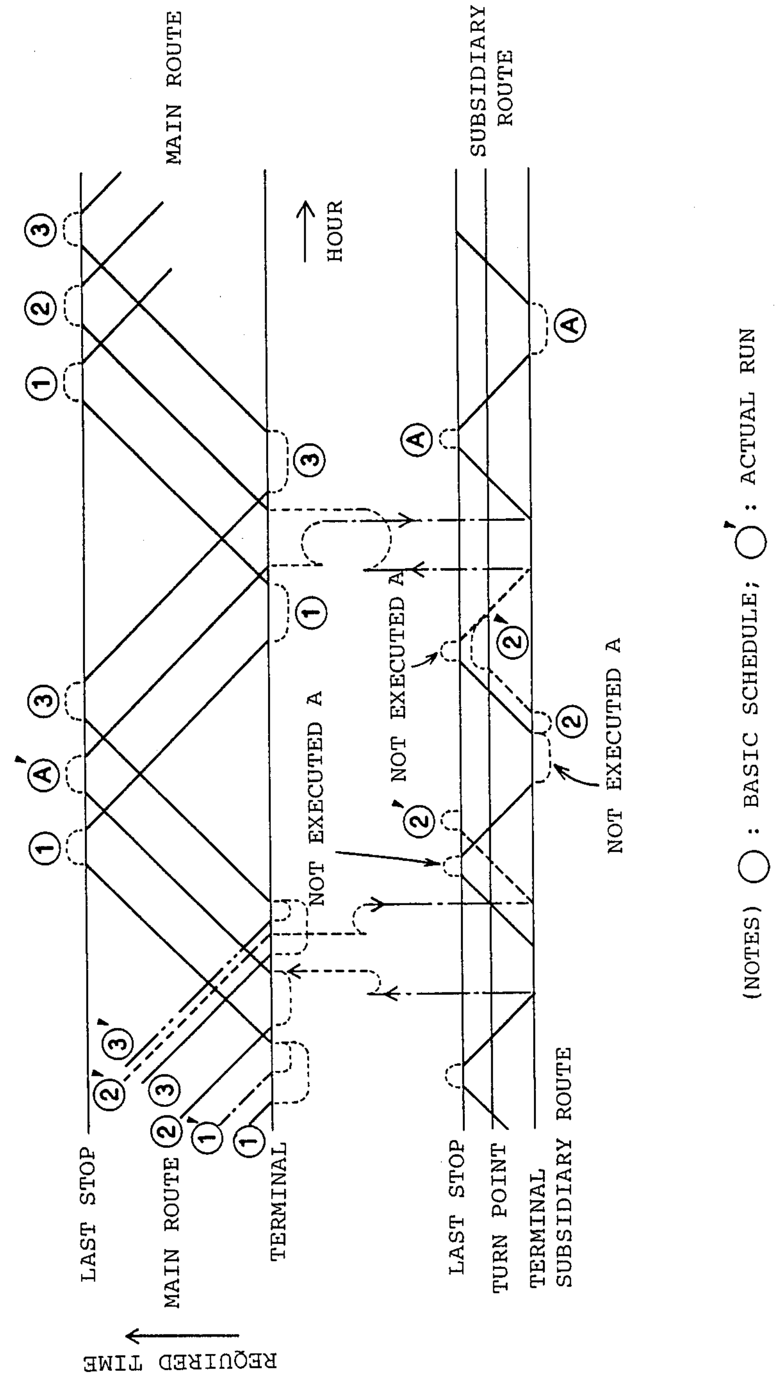
FIG. 15 shows a schedule for making up a service timetable in an even further embodiment of the invention.

An even further embodiment of FIG. 15 is concerned with an example of how to determine a service timetable for each of the route buses reciprocating between a terminal and a turn point in the aforesaid embodiments.

FIG. 15 graphically shows schedules relative to exchange of buses X and Y in main and subsidiary routes, of which merely a single route is plotted for simplifying the illustration. In the figure, an actual-run schedule ②' corresponds to the bus X, and an actual-run schedule A corresponds to the bus Y.

Suppose now that the bus X running on the schedule ②' is estimated to arrive at the terminal with a delay beyond the aforesaid range of $\alpha+\beta+t$ due to the traffic conditions on the main route. Then the optimal bus Y running on the schedule A is selected from the subsidiary route and is started on the main route A' according to the basic schedule, while the bus arriving with a delay on the schedule ②' is transferred to the subsidiary route, whereby the aforesaid exchange is carried out to consequently maintain the original basic schedule ② for the main route. And after the bus running on the schedule A' has completed one stroke of the main route, it is transferred to the subsidiary route again to resume the original schedule A.

The schedule A is not executed on the subsidiary route until exchange with the schedule ②, so that it is necessary to modify the schedule for a regular-interval service by extension adjustment on the subsidiary route. After the bus on the schedule ② transferred to the subsidiary route for exchange, an extended regular-interval service is carried out continuously with other schedules for the subsidiary route until resumption of the schedule ② for the main route. In FIG. 15, the following four service patterns are realizable with respect to the actual-run schedule ②'.

(1) Two strokes (2) One stroke+turn back (3) One stroke+standby adjustment at terminal (4) Standby adjustment at terminal When the buses X and Y have arrived at the final estimation point Q after modification of the schedules as mentioned above, one-stroke schedules for the buses X and Y from the terminal are determined by the central processor on the basis of such actual passage time, whereby service information is obtained and displayed on the information display units for the buses X and Y which have arrived at the terminal.

According to the present invention described hereinabove, a variety of remarkable effects are attainable as follows.

Firstly, a route bus service can be carried out in accordance with the timetable based on the modified service schedule while a bus driver is visually informed of such modified service schedule from the ground radio unit, so that regular-interval arrivals and departures of the route buses can be maintained at the terminal to widely enhance the convenience of passengers.

Secondly, due to the capability of providing accurate service information inclusive of the passage hour, it becomes possible to secure a punctual service.

And thirdly, in case a bus driver fails to carry a service timetable with him, he is rendered capable of performing the work in conformity to an accurate modified service schedule transmitted continuously from the central service controller, whereby the duty burden on the driver is much reduced.

What is claimed is:

1. A route bus service controlling system for a plurality of buses running along a route between a terminal and a turn point via a plurality of intermediate passage points, said system comprising:

ground radio units installed at said plurality of intermediate points and at a terminal passage point and a turn passage point and serving to detect passage of route buses past said passage points and developing information signals indicative of such passage and transmitting said signals;

a central service controller for computing overall service information from said signals transmitted by said ground radio units at the individual passage points, then determining modified service schedules for the specific route buses at the passage points on the basis of the result of such computation, and transmitting the modified service schedules to the route buses by way of said ground radio units; and service information display units in the route buses for displaying the modified service schedules received by way of said ground radio units for the route buses in the individual sections of said bus service route; and on the basis of said signals transmitted by one ground radio unit with regard to the route bus departed first from the related passage point, the arrival hour of the next route bus and that of the succeeding route bus passing therethrough are estimated by said central service controller, and a basic service schedule of each route bus computed from the estimated hour is displayed on the service information display unit installed in each of the route buses.

2. The system as defined in claim 1, wherein main and subsidiary bus service routes are formed between a plurality of turn points and said terminal and a relationship is established between said main route and said subsidiary route, and, under predetermined conditions, a route bus is transferred from said subsidiary route to said main route in a specific route section, and a modified service schedule computed on the basis of such conditions is displayed in each of the route buses.

3. The system as defined in claim 1, wherein the service schedule of one specific route bus transmitted from said central service controller with respect to the point being passed by said bus is temporarily stored in the ground radio unit installed at said point until the next information is received, and at the passage of said one specific route bus, said service schedule is outputted to the service information display unit in said route bus.

4. The system as defined in claim 1, wherein the basic schedules of the succeeding route buses are determined on the basis of the passage information of one preceding route bus having first passed by said ground radio unit and, while the original basic service schedules are displayed on said service information display units, modified service schedules of the individual route buses are computed and determined by said central service controller on the basis of the momentarily varying passage information of said preceding and succeeding route buses.

5. The system as defined in claim 4, wherein said modified service schedule is computed on the basis of conditions including the standby and halt time at a bus terminal and each of a plurality of bus stops, and the delay time caused with respect to the basic service schedule by the traffic state.

6. The system as defined in claim 4, wherein said modified service schedule is computed on the basis of conditions including the standby and halt time at a bus terminal and each of a plurality of bus stops, the delay time caused with respect to the basic service schedule by the traffic state, and time required to resume the basic service schedule between one of said passage points and the next passage point.

7. The system as defined in claim 2, wherein the delay time caused by the traffic state on the main route is computed by said central service controller with respect to each of the buses running on said main and subsidiary routes, and modified service schedules for maintaining regular time intervals of the route buses are computed by said central service controller and displayed on said service information display units installed in the route buses.

8. The system as defined in claim 7, wherein said modified service schedule is made up by computing the delay time caused by the traffic state inclusive of the route bus transferred from said subsidiary route and, when the delay time is long, the service schedule of the preceding route bus is displayed as a modified service schedule of the succeeding route bus.

* * * * *

UNITED STATES PATENT AND TRADEMARK OFFICE
CERTIFICATE OF CORRECTION

PATENT NO. : 4,791,571

DATED : December 13, 1988

INVENTOR(S) : Shinichi Takahashi et al.

It is certified that error appears in the above-identified patent and that said Letters Patent is hereby corrected as shown below:

Front page, in the Abstract, line 2, "unit" should be --units--.

Column 6, line 33, after "the" (first occurrence) insert --schedules--.

Column 7, line 25, the numeral "9" should be --3--;

line 60, "$\beta$ 1" should be --$\alpha$ 1--.

Signed and Sealed this

Twenty-fourth Day of October, 1989

Attest:

DONALD J. QUIGG

*Attesting Officer*

*Commissioner of Patents and Trademarks*